US011095666B1

(12) United States Patent
Li et al.

(10) Patent No.: US 11,095,666 B1
(45) Date of Patent: Aug. 17, 2021

(54) SYSTEMS AND METHODS FOR DETECTING COVERT CHANNELS STRUCTURED IN INTERNET PROTOCOL TRANSACTIONS

(71) Applicant: CA, INC., San Jose, CA (US)

(72) Inventors: Qing Li, Cupertino, CA (US); Chris Larsen, Orem, UT (US); Jon DiMaggio, Gainesville, VA (US)

(73) Assignee: CA, INC., San Jose, CA (US)

( * ) Notice: Subject to any disclaimer, the term of this patent is extended or adjusted under 35 U.S.C. 154(b) by 352 days.

(21) Appl. No.: 16/114,732

(22) Filed: Aug. 28, 2018

(51) Int. Cl.
*H04L 29/06* (2006.01)
*H04L 29/12* (2006.01)

(52) U.S. Cl.
CPC ........ *H04L 63/1416* (2013.01); *H04L 63/145* (2013.01); *H04L 63/1425* (2013.01); *H04L 61/1511* (2013.01); *H04L 61/6059* (2013.01)

(58) Field of Classification Search
CPC ............. H04L 63/1416; H04L 63/1425; H04L 63/145; H04L 61/1511; H04L 61/6059
See application file for complete search history.

(56) References Cited

U.S. PATENT DOCUMENTS

| 9,654,484 B2 * | 5/2017 | Grill ...................... H04L 67/104 |
| 9,692,771 B2 | 6/2017 | Dinerstein |
| 9,917,852 B1 * | 3/2018 | Xu ....................... H04L 63/0236 |
| 2014/0230054 A1 * | 8/2014 | Dinerstein ............... H04L 63/14 726/22 |
| 2015/0135253 A1 * | 5/2015 | Angel ...................... G06F 21/62 726/1 |
| 2016/0063541 A1 * | 3/2016 | Geng .................. G06Q 30/0248 705/14.47 |

(Continued)

OTHER PUBLICATIONS

BuisnessWire, "Blue Coat Introduces Industry's First IPv6 Secure Web Gateway Solution for Seamless Application Migration from IPv4 to IPv6", accessed at https://www.businesswire.com/news/home/20100125005349/en/Blue-Coat-Introduces-Industry%E2%80%99s-IPv6-Secure-Web, accessed on Jan. 5, 2010, 2 pages.

(Continued)

*Primary Examiner* — Kristine L Kincaid
*Assistant Examiner* — Alexander R Lapian
(74) *Attorney, Agent, or Firm* — Foley & Lardner LLP

(57) ABSTRACT

The disclosed computer-implemented method for detecting covert channels structured in Internet Protocol (IP) transactions may include (1) intercepting an IP transaction including textual data and a corresponding address, (2) evaluating the textual data against a model to determine a difference score, (3) determining that the textual data is suspicious when the difference score exceeds a threshold value associated with the model, (4) examining, upon determining that the textual data is suspicious, the address in the transaction to determine whether the address is invalid, (5) analyzing the transaction to determine a frequency of address requests that have been initiated from a source address over a predetermined period, and (6) identifying the transaction as a covert data channel for initiating a malware attack when the address is determined to be invalid and the frequency of the address requests exceeds a threshold value. Various other methods, systems, and computer-readable media are also disclosed.

20 Claims, 7 Drawing Sheets

(56) References Cited

U.S. PATENT DOCUMENTS

| | | | | |
|---|---|---|---|---|
| 2016/0337333 A1* | 11/2016 | Rollet | .................. | H04L 63/083 |
| 2017/0155667 A1* | 6/2017 | Sobel | .................. | H04L 63/1416 |
| 2017/0366576 A1* | 12/2017 | Donahue | ............ | H04L 63/1425 |
| 2018/0012021 A1* | 1/2018 | Volkov | .................... | G06F 21/53 |
| 2018/0115582 A1* | 4/2018 | Thakar | ............... | H04L 63/1466 |
| 2019/0245875 A1* | 8/2019 | Chen | ....................... | H04L 29/06 |
| 2019/0281079 A1* | 9/2019 | Xu | ...................... | H04L 63/1441 |

OTHER PUBLICATIONS

BusinessWire, "Blue Coat Introduces Industry's First IPv6 WAN Optimization Solution", accessed at https://www.businesswire.com/news/home/20110209005598/en/Blue-Coat-Introduces-Industry%E2%80%99s-IPv6-WANOptimization,accessed on Feb. 9, 2011, 3 pages.

Dunn, John E., "'Back door' IPv6 apps now visible to Blue Coat's PacketShaper", accessed at https://www.techworld.com/news/security/back-door-ipv6-apps-now-visible-blue-coats-packetshaper-3349198/, accessed on Apr. 4, 2012, 2 pages.

DiMaggiio, Jon, "Operation Bachosens: A detailed look into a long-running cyber crime campaign", accessed at https://medium.com/threat-intel/cybercrime-investigation-insights-bachosens-e1d6312f6b3a, accessed on May 31, 2017, 12 pages.

\* cited by examiner

SYSTEMS AND METHODS FOR DETECTING COVERT CHANNELS STRUCTURED IN INTERNET PROTOCOL TRANSACTIONS

BACKGROUND

Viruses, Trojans, spyware, and other kinds of malware are a constant threat to any computing device that requires network connectivity. One method of leveraging network connectivity to introduce malware on a computing device may include utilizing Internet Protocol (IP) transactions. For example, a malicious actor (such as a bot) may leverage properly formatted IPv6 DNS queries and responses as covert channels on a user's computing device to trickle malware bytes or data on a user's computing device in lieu of returning an actual IPv6 address associated with a valid domain name.

Unfortunately, traditional systems for detecting IP-based malware attacks may rely on techniques that can be easily circumvented by attackers. For example, traditional systems may utilize pattern-based detection or malware detection signatures based on specific filenames and/or a registry key. However, pattern-based solutions may be ineffective due to the number of attack variations that may be utilized in IP-based malware attacks. For example, given the enormity of the IPv6 address space and the random nature of IPv6 address generation), an attacker may easily avoid pattern-based detection by using only a portion of the available address space as well as only parts of a domain name, to trickle malware data. Moreover, an attacker may easily bypass existing detection signatures by simply changing the filename and/or a registry key value created by the malware.

SUMMARY

As will be described in greater detail below, the instant disclosure describes various systems and methods for detecting covert channels structured in internet protocol (ip) transactions.

In one example, a method for detecting covert channels structured in internet protocol (ip) transactions may include (1) intercepting an IP transaction including textual data and a corresponding address, (2) evaluating the textual data against a model of known names to determine a difference score, (3) determining that the textual data is suspicious when the difference score exceeds a threshold value associated with the model, (4) examining, upon determining that the textual data is suspicious, the address in the IP transaction to determine whether the address is invalid, (5) analyzing the IP transaction to determine a frequency of address requests that have been initiated from a source IP address over a predetermined period, and (6) identifying the IP transaction as a covert data channel for initiating a malware attack when the address is determined to be invalid and the frequency of the address requests that have been initiated exceeds a frequency threshold value.

In one example, the computer-implemented method may further include initiating a security action to protect the computing device against the malware attack. In some examples, intercepting the IP transaction may include utilizing a proxy for intercepting a domain name system (DNS) transaction including a DNS query for the address and a reply to the DNS query. Additionally or alternatively, intercepting the IP transaction may include utilizing a proxy for intercepting a hypertext transfer protocol request including a uniform resource locator associated with the address.

In some examples, evaluating the textual data against the model may include (1) comparing the textual data to a plurality of N-grams of various sizes associated with known domain names, (2) determining a degree of variance between the textual data and the N-grams based on the comparison, and (3) assigning the difference score to the textual data based on the degree of variance. In some embodiments, examining the address in the IP transaction may include (1) determining whether a syntax of the address corresponds to a valid IP address syntax, (2) determining whether a prefix associated with the address matches a registered name in a registration database, and (3) determining that the address is invalid when the syntax does not correspond to a valid IP address syntax or the prefix does not match a registered name in the registration database. In one embodiment, determining that the address is invalid may further include determining that a syntax for a resolver address at the end of a referral chain does not correspond to a valid IP address syntax or that a resolver address prefix does not match a registered name in the registration database.

In some examples, analyzing the IP transaction may include checking DNS query statistics for a frequency of requests made for the address in the IP transaction against the source IP address. In some embodiments, identifying the IP transaction as a covert data channel may include identifying the address as an invalid IP address that includes one or more portions of a malware data payload.

In some examples, the textual data may correspond to a format associated with a valid DNS domain name and the address may correspond to a format associated with a valid IP address. In some embodiments, the IP transaction may be an IPv6 transaction. In one example, the textual data may include a domain name hierarchy that may further include a main domain and at least one subdomain.

In one embodiment, a system for implementing the above-described method may include (1) an intercepting module, stored in physical memory, that intercepts an IP transaction including textual data and a corresponding address on a computing device, (2) an evaluation module, stored in the memory, that evaluates the textual data against a model of known names to determine a difference score, (3) a determining module, stored in the memory, that determines that the textual data is suspicious when the difference score exceeds a threshold value associated with the model, (4) an examination module, stored in the memory, that examines, upon determining that the textual data is suspicious, the address in the IP transaction to determine whether the address is invalid, (5) an analysis module, stored in the memory, that analyzes the IP transaction to determine a frequency of address requests that have been initiated from a source IP address over a predetermined period, (6) an identification module, stored in the memory, that identifies the IP transaction as a covert data channel for initiating a malware attack when the address is determined to be invalid and the frequency of the address requests that have been initiated exceeds a frequency threshold value, and (7) at least one physical processor configured to execute the intercepting module, the evaluation module, the determining module, the examination module, the analysis module, and the identification module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) intercept an Internet Protocol (IP) transaction including textual data and a corresponding address on the computing device, (2) evaluate the textual data against a model of known names to determine a difference score, (3) determine that the textual data is suspicious when the difference score exceeds a threshold value associated with the model, (4) examine, upon determining that the textual data is suspicious, the address in the IP transaction to determine whether the address is invalid, (5) analyze the IP transaction to determine a frequency of address requests that have been initiated from a source IP address over a predetermined period, and (6) identify the IP transaction as a covert data channel for initiating a malware attack when the address is determined to be invalid and the frequency of the address requests that have been initiated exceeds a frequency threshold value.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
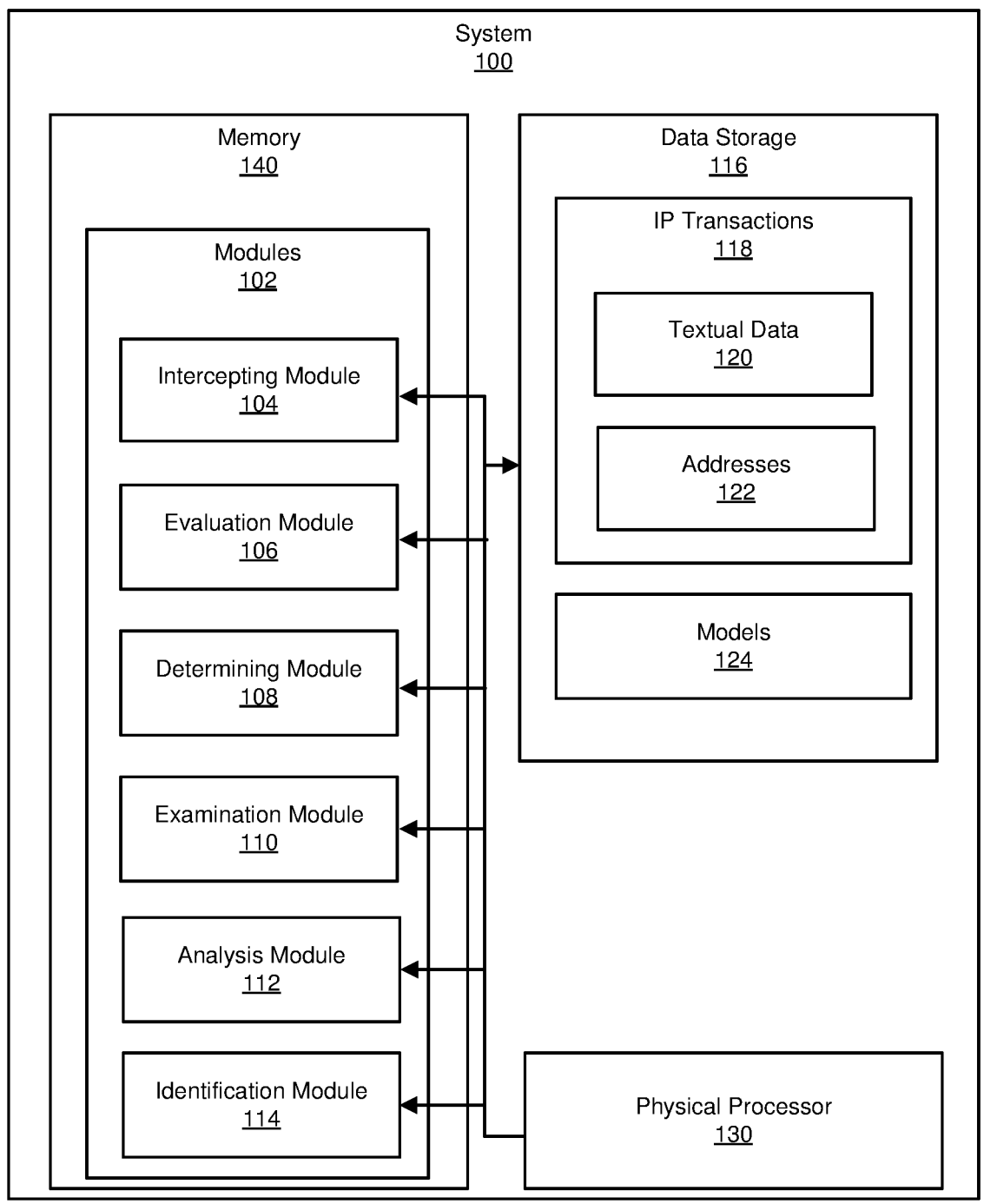
FIG. 1 is a block diagram of an example system for detecting covert channels structured in internet protocol (ip) transactions.

Throughout the drawings, identical reference characters and descriptions indicate similar, but not necessarily identical, elements. While the example embodiments described herein are susceptible to various modifications and alternative forms, specific embodiments have been shown byway of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for detecting covert channels structured in internet protocol (ip) transactions (e.g., IPv6 transactions). As will be explained in greater detail below, by evaluating textual data (such as Internet domain names or hypertext transfer protocol URLs) utilized in IP transactions initiated on a computing device against known data in one or more models for irregularities and further examining the validity of addresses utilized in the IP transactions on the computing device, the systems described herein may be able to identify covert data channels masquerading as valid IP transactions for initiating malware attacks that may otherwise be missed by traditional pattern matching methods that rely on signature-based detection.

In addition, the systems and methods described herein may improve the functioning of a computing device and/or the field of computer security, by detecting malware attacks utilizing covert channels masquerading as valid IP transactions with increased accuracy and thus reducing the computing device's likelihood of infection.

Figure 2:
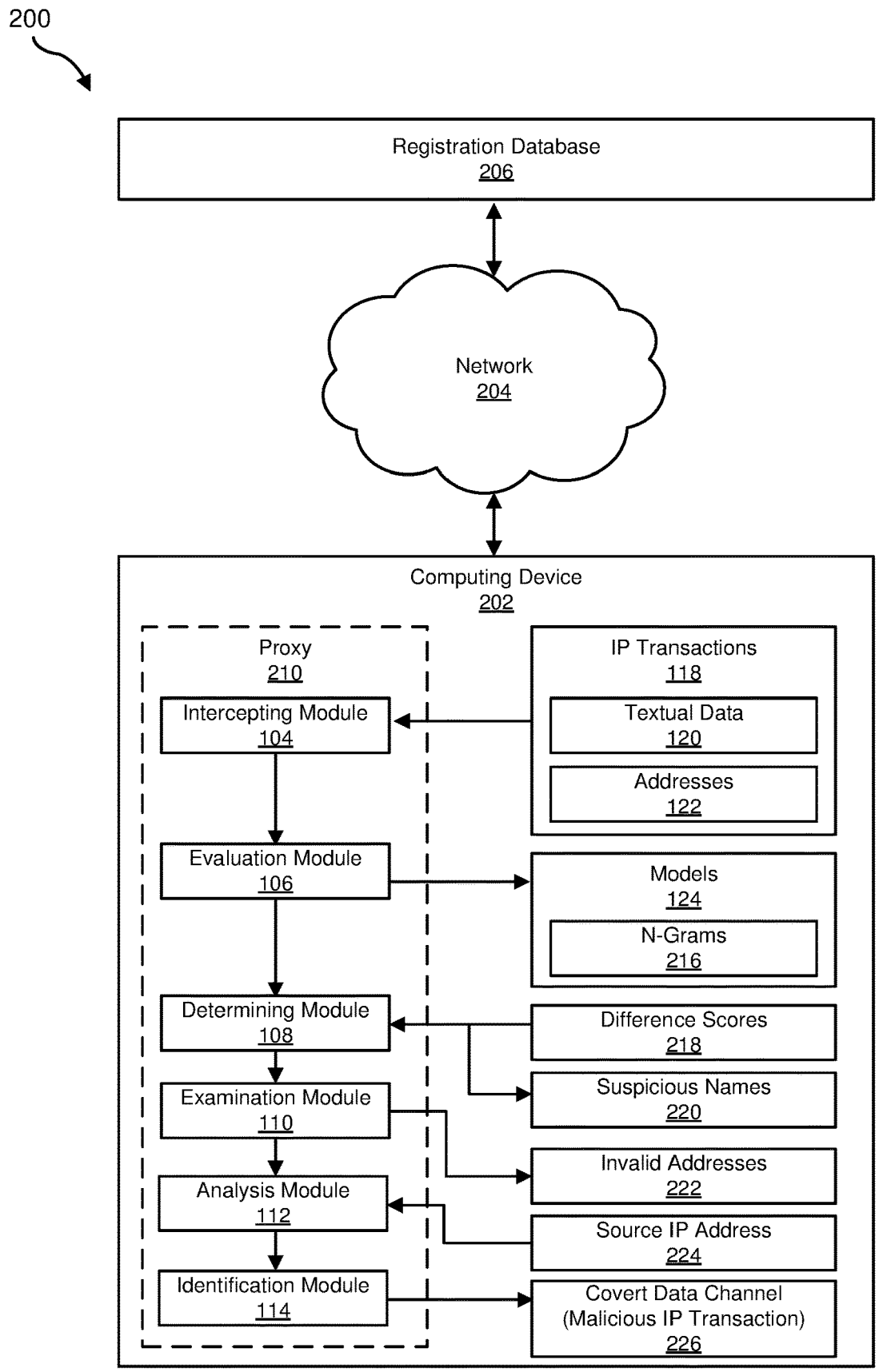
FIG. 2 is a block diagram of an additional example system for detecting covert channels structured in internet protocol (ip) transactions.

The following will provide, with reference to FIGS. 1-2, detailed descriptions of example systems for detecting covert channels structured in internet protocol (ip) transactions. Detailed descriptions of corresponding computer-implemented methods will also be provided in connection with FIG. 3. Detailed descriptions of example Internet Protocol transactions utilized as covert channels and textual data and addresses that may be utilized in the Internet Protocol transactions will be provided in connection with FIGS. 4 and 5, respectively. In addition, detailed descriptions of an example computing system and network architecture capable of implementing one or more of the embodiments described herein will be provided in connection with FIGS. 6 and 7, respectively.

FIG. 1 is a block diagram of an example system 100 for detecting covert channels structured in internet protocol (ip) transactions. As illustrated in this figure, example system 100 may include one or more modules 102 for performing one or more tasks. As will be explained in greater detail below, modules 102 may include an intercepting module 104 that intercepts IP transactions 118 including textual data 120 and addresses 122, on a computing device. Example system 100 may also include an evaluation module 106 that evaluates textual data 120 against models 124 of known names to determine a difference score. Example system 100 may additionally include a determining module 108 that determines that textual data 120 is suspicious when the difference score exceeds a threshold value associated with models 124. Example system 100 may also include an examination module 110 that examines addresses 122 to determine whether addresses 122 are invalid. Example system 100 may additionally include an analysis module 112 that analyzes addresses 122 to determine a frequency of address requests initiated from a source IP address over a predetermined period. Example system 100 may also include an identification module 114 that identifies IP transactions 118 as a covert data channel. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202). One or more of modules 102 in FIG.

1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate detecting covert channels structured in internet protocol (ip) transactions. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include a data storage 116 for storing IP transactions 118 and models 124. Each of IP transactions 118 on data storage 116 may include textual data 120 and addresses 122.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a registration database 206 via a network 204. In one example, all or a portion of the functionality of modules 102 may be performed by computing device 202 and/or any other suitable computing system, via a proxy 210 (e.g., a DNS or HTTP proxy) that is capable of intercepting IP transactions, analyzing IP transactions, and taking one or more actions based on the analysis. As will be described in greater detail below, one or more of modules 102 from FIG. 1 may, when executed by at least one processor of computing device 202, enable computing device 202 to detect covert channels structured in Internet Protocol (IP) transactions. For example, and as will be described in greater detail below, intercepting module 104 may intercept one more IP transactions 118 including textual data 120 and one or more corresponding addresses 122. Evaluation module 106 may then evaluate textual data 120 against models 124 of known names (composed as N-grams 216) to determine a difference score 218. Next, determining module 108 may determine that textual data 120 is suspicious (e.g., contains suspicious names 220) when one or more difference scores 218 exceeds a threshold value associated with models 124. Examination module 110 may then examine, upon determining that textual data 120 is suspicious, each of addresses 122 to determine whether any addresses 122 are invalid addresses 222 by communicating with a database of valid addresses such as registration database 206. Next, analysis module 112 may analyze IP transactions 118 to determine a frequency of address requests that have been initiated from a source IP address 224 over a predetermined period. Identification module 114 may then identify one or more IP transactions 118 as a covert data channel 226 for initiating a malware attack based on invalid addresses 222 and when the frequency of the address requests that have been initiated exceeds a frequency threshold value.

Computing device 202 generally represents any type or form of computing device capable of reading computer-executable instructions. In some examples, computing device 202 may include a client computing device. In other examples, computing device 202 may include a server computing device. In additional examples, computing device may include a network appliance. In some examples, the aforementioned computing devices represented by computing device 202 may include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Registration database 206 generally represents any type or form of computing device that is capable of being used to validate addresses 122 (e.g., IP addresses) against addresses having registered domain names. Additional examples of registration database 206 include, without limitation, security servers, application servers, web servers, storage servers, and/or database servers configured to run certain software applications and/or provide various security, web, storage, and/or database services. Although illustrated as a single entity in FIG. 2, registration database 206 may include and/or represent a plurality of servers that work and/or operate in conjunction with one another.

Network 204 generally represents any medium or architecture capable of facilitating communication or data transfer. In one example, network 204 may facilitate communication between computing device 202 and registration database 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
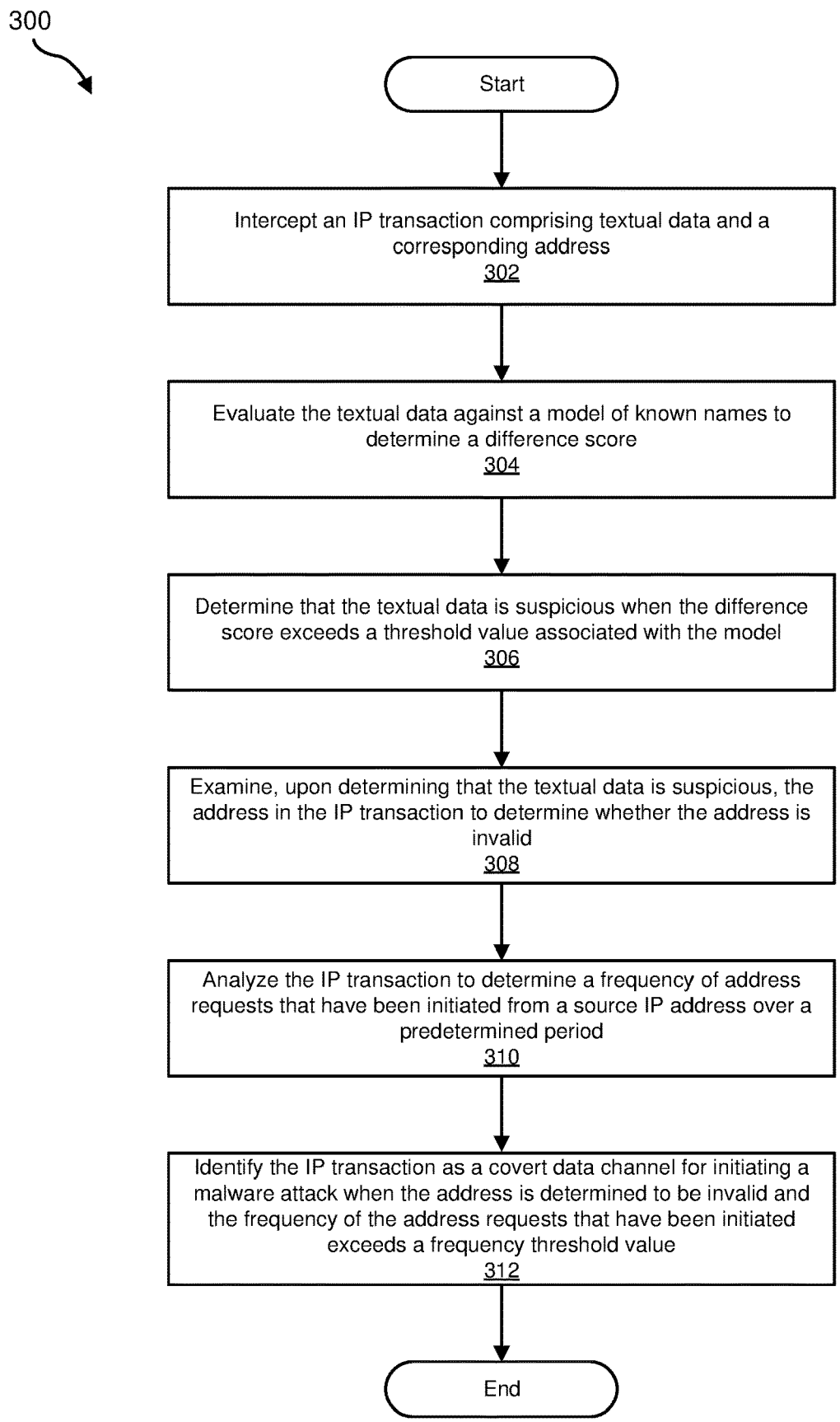
FIG. 3 is a flow diagram of an example method for detecting covert channels structured in internet protocol (ip) transactions.

FIG. 3 is a flow diagram of an example computer-implemented method 300 for detecting covert channels structured in internet protocol (ip) transactions. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may intercept an IP transaction including textual data and a corresponding address. For example, intercepting module 104, utilizing proxy 210, may, as part of computing device 202 in FIG. 2, intercept one more IP transactions 118 including textual data 120 and an address 122.

The term "IP transactions," as used herein generally refers to any communication of data that may be formatted according to an Internet Protocol on a computing device. In some examples, an IP transaction may include sending data formatted as a domain name in a DNS query for an IP address (e.g., an IPv6 address) and then receiving data formatted as the address in a reply. In some examples, the data formatted as the domain name may consist of characters representing a fake domain name and the data formatted as the address may consist of characters representing an invalid address for the construction of a covert data channel.

The term "textual data," as used herein, generally refers to any ASCII formatted text that is capable of being utilized in an IP transaction on a computing device. In some examples, textual data may include a combination of ASCII characters formatted as a DNS domain or subdomain name used in a records query for a corresponding IP address. In other examples, textual data may include a combination of ASCII characters formatted as an HTTP URL request.

Intercepting module 104 may intercept IP transactions 118 in a variety of ways. For example, intercepting module 104 may utilize proxy 210 (e.g., an DNS proxy) to intercept a domain name system (DNS) transaction including a DNS query for an address 122 as well as a reply to the DNS query. Additionally or alternatively, intercepting module 104 may utilize proxy 210 (e.g., a HTTP proxy) for intercepting a hypertext transfer protocol request including a uniform resource locator associated with an address 122. In some examples, textual data 120 may correspond to a format associated with a valid IPv6 DNS domain name for an IPv6 address. In other examples, textual data 120 include a DNS domain name hierarchy including a main domain and one or more subdomains. In some examples, an address 122 may correspond to a format associated with a valid IPv6 address.

At step 304, one or more of the systems described herein may evaluate the textual data against a model of known names to determine a difference score. For example, evaluation module 106, utilizing proxy 210, may, as part of computing device 202 in FIG. 2, evaluate textual data 120 against one or more models 124 of known names to determine a difference score 218.

Evaluation module 106 may evaluate textual data 120 against models 124 in a variety of ways. In some examples, evaluation module 106 may compare textual data 120 to N-grams 216 of various sizes associated with known domain names, determine a degree of variance between textual data 120 and N-grams 216 based on the comparison, and assign difference scores to textual data 120 based on the degree of variance.

The term "N-grams," as used herein, generally refers to any contiguous sequence of 'N' text characters from a character string. An N-gram may consist of, without limitation, bi-grams, tri-grams, and/or four-grams. In some examples, an N-gram may be a sequence of 'N' letters and/or numbers in a domain name. In other examples, an N-gram may be a sequence of 'N' letters and/or numbers in an HTTP URL.

In some examples, the evaluation of textual data 120 to N-grams 216 by evaluation module 106 may include assessing the typicality of name includes a group of characters against a collection of N-grams extracted from a collection of DNS domain names, previously used over a number of years, that were used to build models 124. In one example, evaluation module 106 may, after receiving a name in textual data 120, determine one or more N-gram sizes, and extract a group of N-grams corresponding to each N-gram size from the name. The extracted group of N-grams may then be analyzed with respect to N-grams 216 in models 124. The analysis of the group of N-grams with respect to a model 124 may include obtaining a difference score 218. Finally, the evaluation module 106 may determine whether the difference score 218 indicates that the first name is typical. For example, if the analysis by evaluation module 106 indicates that a name in textual data 120 contains N-grams 216 that are highly unusual (e.g., atypical, rare, exotic, and/or unique) with respect to N-grams 216 in models 124, then the evaluation module 106 may assign a high difference score 218 to textual data 120. The larger the difference between N-grams 216 in models 124 and the N-grams extracted from names in textual data 120, the higher the difference score that is assigned by evaluation module 106. For example, textual data 120 may include a character string containing nonsensical characters such as: "n.n.c.237735C7DCF34DE59F8E04CB852401B3.dnslookupdater[.]com." Thus, in this example, evaluation module 106 may assign a high difference score 218 to textual data 120 based a high degree of variance with respect to N-grams 216 in models 124. As a result, there is a low likelihood that textual data 120 corresponds to a valid DNS domain name.

At step 306, one or more of the systems described herein may determine that the textual data is suspicious when the difference score exceeds a threshold value associated with the model, based on the evaluation performed at step 304. For example, determining module 108, utilizing proxy 210, may, as part of computing device 202 in FIG. 2, determine that textual data 120 is suspicious based on a difference score 218 exceeding a threshold value associated with models 124.

Determining module 108 may determine that textual data 120 is suspicious in a variety of ways. In some examples, determining module 108 may determine that textual data 120 is suspicious when an assigned difference score 218 is above a threshold value of 50 (i.e., more than 50% of N-grams in textual data 120 do not match N-grams 216 in models 124). For example, if, at step 304, evaluation module 106 determines that 90% of the N-grams extracted from textual data 120 do not match any N-grams 216 in models 124, evaluation module 106 may assign a difference score 218 having a value of 90 to textual data 120. Thus, since the threshold value of 50 has been exceeded, determination module 108 may determine that textual data 120 contains suspicious data. In some examples, where textual data 120 includes one or more names formatted as DNS domain names, determination module 108 may determine that textual data 120 contains one or more suspicious domain names (i.e., suspicious names 220).

At step 308, one or more of the systems described herein may examine, upon determining that the textual data is suspicious at step 306, the address in the IP transaction to determine whether the address is invalid. For example, examination module 110, utilizing proxy 210, may, as part of computing device 202 in FIG. 2, examine one or more addresses 122 in IP transactions 118 to determine whether an address 122 is invalid (i.e., an invalid address 222).

Examination module 110 may determine whether an address 122 is invalid in a variety of ways. In some examples, examination module 110 may determine whether a syntax of an address 122 corresponds to a valid IP address syntax, determine whether a prefix associated with an address 122 matches a registered domain name in registration database 206, and determine that an address 122 is invalid when the syntax does not correspond to a valid IP address syntax or the prefix does not match a registered name in registration database 206. In one example, a valid IP address syntax may correspond to a valid IPv6 address syntax and the prefix may be a /64 IPv6 prefix associated with a valid IPv6 address. For example, an address 122 may include the following character string "2016-08-08 17:26 2016-08-08 17:26." In this example, examination module 110 may determine that the aforementioned character string is syntactically invalid as an IPv6 address because it does not correspond to a valid IPv6 format (i.e., 8 groups of hexadecimal digits separated by colons). As another example, an address 122 may include the following character string: "a67d:db8:a2a1:7334:7654:4325:370:2aa3" returned in response to DNS domain name query for an IPv6 address. In this example, examination module 110 may determine that the aforementioned character string, while corresponding to a valid IPv6 format (i.e., the character string has a correct IPv6 syntax), is invalid because the address prefix (e.g., the /64 prefix) cannot be found in a reverse lookup for a match against a registered domain name in registration database 206. In some examples, examination module 110 may examine an address 122 using all of the examination methods described above so as to eliminate any false positive identifications of a valid address.

Additionally or alternatively, examination module 110 may determine that an address 122 is invalid by determining that a syntax for a resolver address at the end of a referral chain does not correspond to a valid IPv6 address syntax or that the resolver address prefix does not match a registered name in the registration database. For example, a DNS query for an address 122 may include an iterative query process in which a DNS resolver queries a chain of one or more DNS servers. Each server refers the client to the next server in the chain, until the current server can fully resolve the request to return an IP address associated a name in the DNS query.

At step 310, one or more of the systems described herein may analyze the IP transaction to determine a frequency of address requests that have been initiated from a source IP address over a predetermined period. For example, analysis module 112, utilizing proxy 210, may, as part of computing device 202 in FIG. 2, analyze one or more IP transactions 118 to determine a frequency of address requests that have been initiated from source IP address 224.

Analysis module 112 may determine the frequency of address requests in a variety of ways. In some examples, analysis module 112 may check DNS query statistics for a frequency of requests made for any and all IP addresses from source IP address 224 assigned to computing device 202 with respect to a frequency threshold value. For example, analysis module 112 may check DNS query statistics for the number of address requests made over a 24-hour period and determine whether the number of address requests represent a high frequency (e.g., the frequency of the address requests exceeds a frequency threshold value of 50) relative to requests made from source IP address 224 over one or more previous 24-hour periods. In one example, a high frequency of address requests may be indicative of a bad actor attempting to assemble multiple pieces of malware by making multiple DNS queries for fake IP addresses carrying portions of a malware payload.

At step 312, one or more of the systems described herein may identify the IP transaction as a covert data channel for initiating a malware attack when the address is determined to be invalid and the frequency of the address requests that have been initiated exceeds a frequency threshold value (i.e., a high frequency of address requests have been initiated).

For example, identification module 114, utilizing proxy 210, may, as part of computing device 202 in FIG. 2, identify one or more IP transactions 118 as covert data channel 226 when an address 122 has been determined to be invalid by examination module 110 at step 308 and the frequency of the address requests that have been initiated exceeds a frequency threshold value, from source IP address 224 by analysis module 112 at step 310.

The term "covert data channel," as used herein generally refers to any invalid IP transaction on a computing device that may be utilized to retrieve one or pieces of a malware data payload for initiating an attack. In some examples, the covert data channel may be constructed by sending one or more requests for a fake domain name in a DNS query to retrieve one or more fake or invalid IPv6 addresses carrying a malware data payload during an IPv6 transaction.

Identification module 114 may identify covert data channel 226 in a variety of ways. In some examples, identification module 114 may identify covert data channel 226 which may be utilized for initiating a malware attack based on the determination of a suspicious name 220 in textual data 120 at step 306, the determination of an invalid address 222 (e.g., a fake IPv6 address) at step 308, and a high frequency of address requests (i.e., the frequency of address requests exceeds a frequency threshold value) originating from source IP address 224 on computing device 202. Following the aforementioned determination, identification module 114 may be configured to initiate a security action (or alternatively, communicate to a security server for initiating a security action) to protect computing device 202 against the suspected malware attack.

Figure 4:
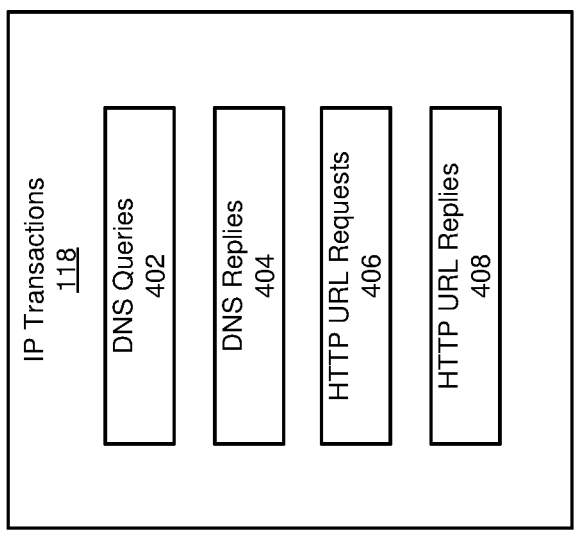
FIG. 4 is a block diagram of example Internet Protocol transactions that may be utilized to construct covert channels.

FIG. 4 is a block diagram of example IP transactions 118 that may be utilized to construct as covert channels. In some examples, IP transactions 118 may include DNS queries 402 and DNS replies 404. Additionally or alternatively, IP transactions 118 may include HTTP URL requests 406 and HTTP URL replies 408.

As discussed above with respect to FIG. 3, one or more DNS queries 402 may include fake domain name data for retrieving fake addresses which, in some examples, may be disguised as a validly formatted IP addresses, in one or more DNS replies. In some examples, the fake addresses may be fake IPv6 addresses carrying a malware payload to attack a computing device. Similarly, one or more HTTP URL requests 406 may include fake name data for retrieving fake URLs which, in some examples, may be disguised as a validly formatted URLs, in one or more HTTP URL replies 408. In some examples, the HTTP URL replies 408 may carry a malware payload to attack a computing device.

Figure 5:
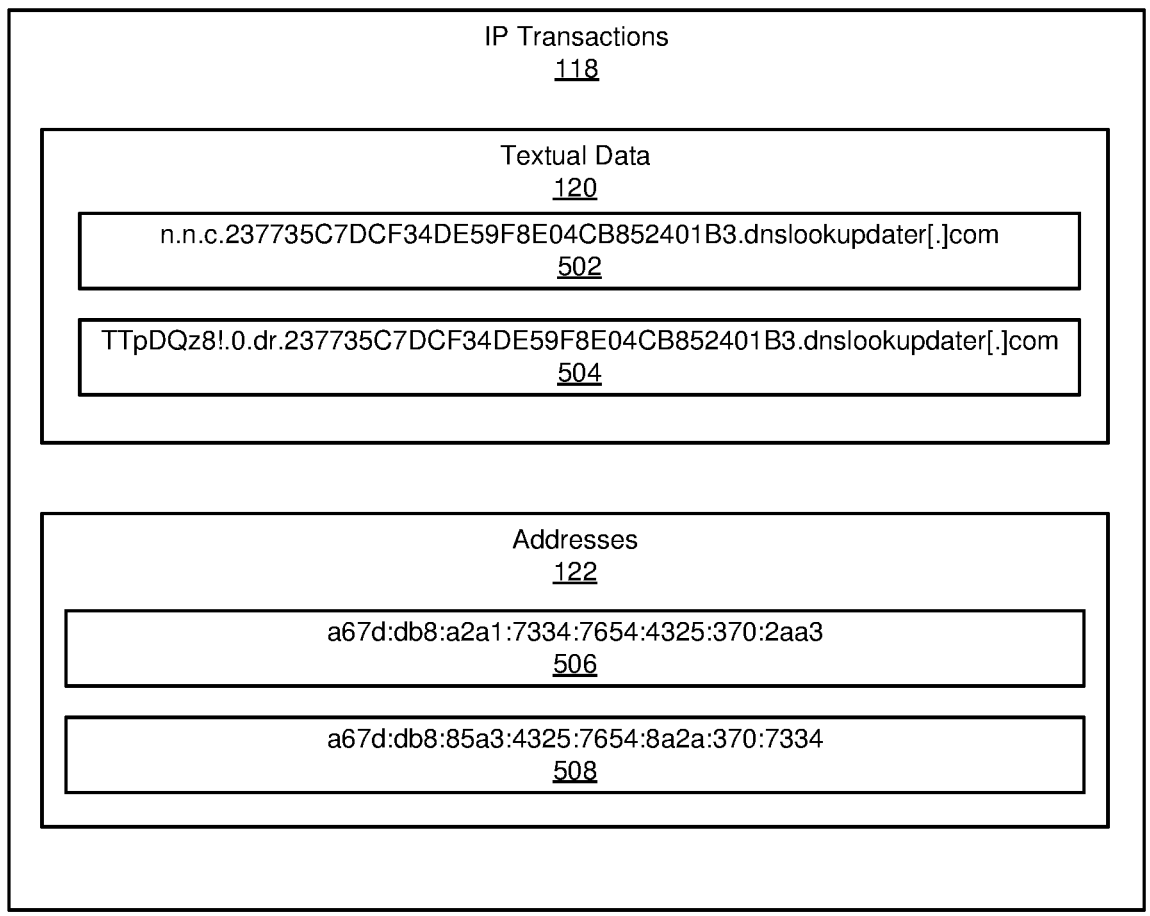
FIG. 5 is a block diagram of example textual data and addresses that may be utilized in Internet Protocol transactions to construct covert data channels.

FIG. 5 is a block diagram of example textual data 120 and addresses 122 that may be utilized in IP transactions 118 to construct covert data channels. In some examples, textual data 120 may include fake or nonsensical DNS domain data 502 and/or 504 which does not correspond to a known domain name hierarchy or portions thereof (e.g., a DNS subdomain). In some examples, addresses 122 may include fake IPv6 addresses 506 and 508 that may be syntactically invalid and/or failing to correspond to a registered domain name in a registration database.

In some examples, data 502 and 504 may be sent in sequential DNS queries to retrieve fake IPv6 addresses 506 and 508 in corresponding DNS replies. In some examples, the aforementioned combination of DNS queries and DNS replies may be used by malicious software (e.g., a bot) to construct a covert data channel for introducing malware on a computing device. For example, data 502 may be sent to retrieve fake IPv6 address 506 carrying a first piece of a malware payload and data 504 may be sent to retrieve fake IPv6 address 508 carrying a second piece of a malware data payload. Once each piece of the malware payload has been retrieved, the malicious software may assemble the pieces for initiating a malware attack on a computing device.

As described in connection with method 300 above, the systems and methods described herein may detect covert channels structured in Internet Protocol (IP) transactions. First, the systems described herein may intercept an IP transaction (e.g., an IPv6 transaction) initiated on a computing device. The IP transaction may include a validly formatted name purported to be a DNS domain name and a validly or invalidly formatted address purported to be an IPv6 address. Next, the systems described herein may evaluate each part of the domain name hierarchy against models containing N-grams of various sizes to identify any rare/exotic/unique N-grams in the domain names under evaluation and assign a score. The larger the difference between the N-grams in the models and the N-grams in the domain names, the higher the score that is assigned to a given domain name under evaluation.

Based on the determined scores exceeding a threshold value associated with known domain names, the systems described herein may examine the validity of the address as an IPv6 address by performing a syntactical validation as a first check, taking the /64 prefix of the address and perform a reverse lookup to check if there is a match against a registered domain, and checking a referral chain to determine if a resolver IP address at the end of the chain is valid or matches a given registration. Finally, the systems described herein may then check DNS query statistics (such as frequency) and the percentage of rare/exotic/unique names against a given source IP address for further actions. By utilizing the aforementioned the techniques, the systems described herein may improve the detection of cover channels constructed for delivering malware in a computing network over previous solutions based on signatures that may be easily circumvented by bad actors in IPv6 transactions.

Figure 6:
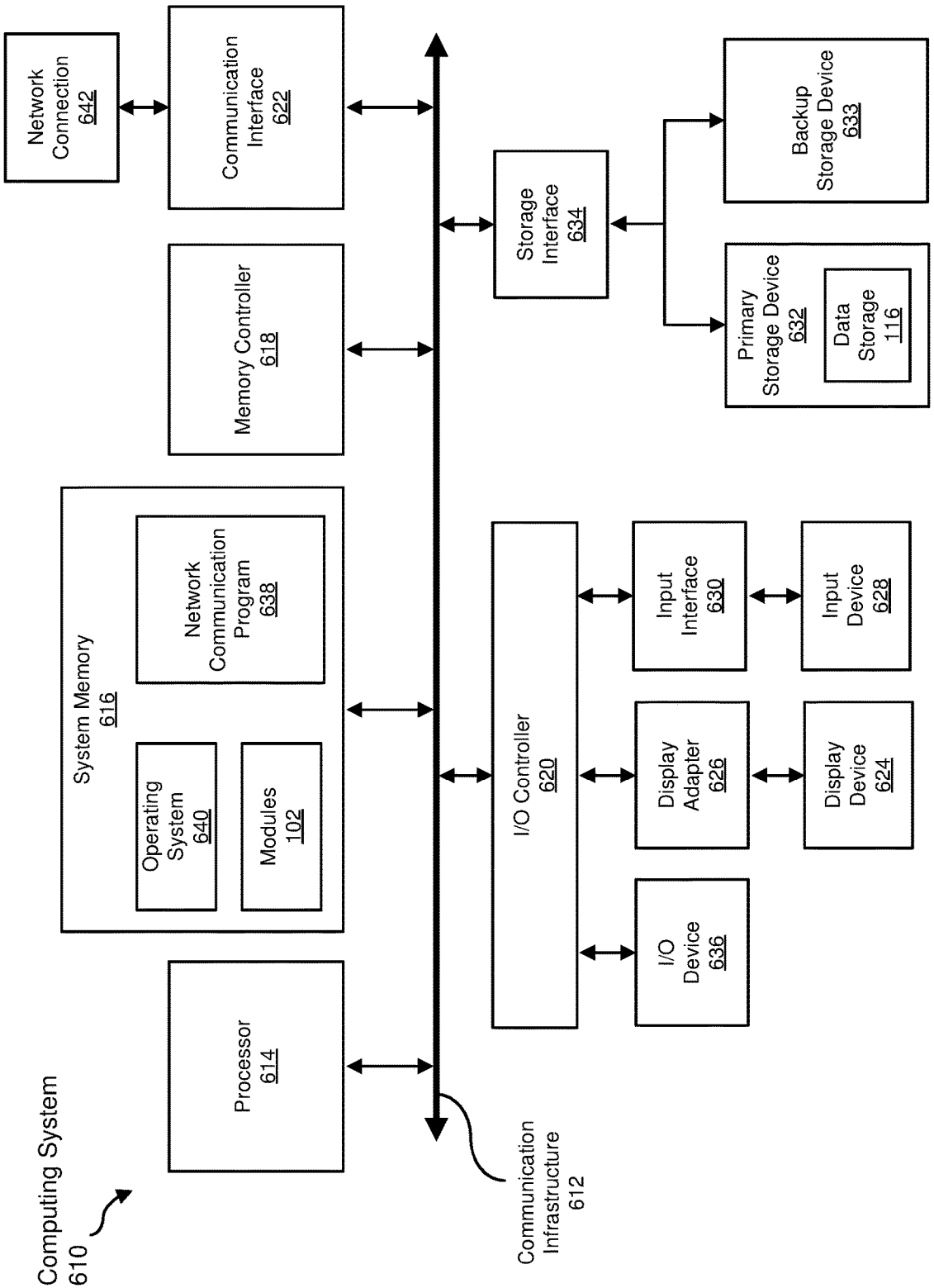
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, data storage 116 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
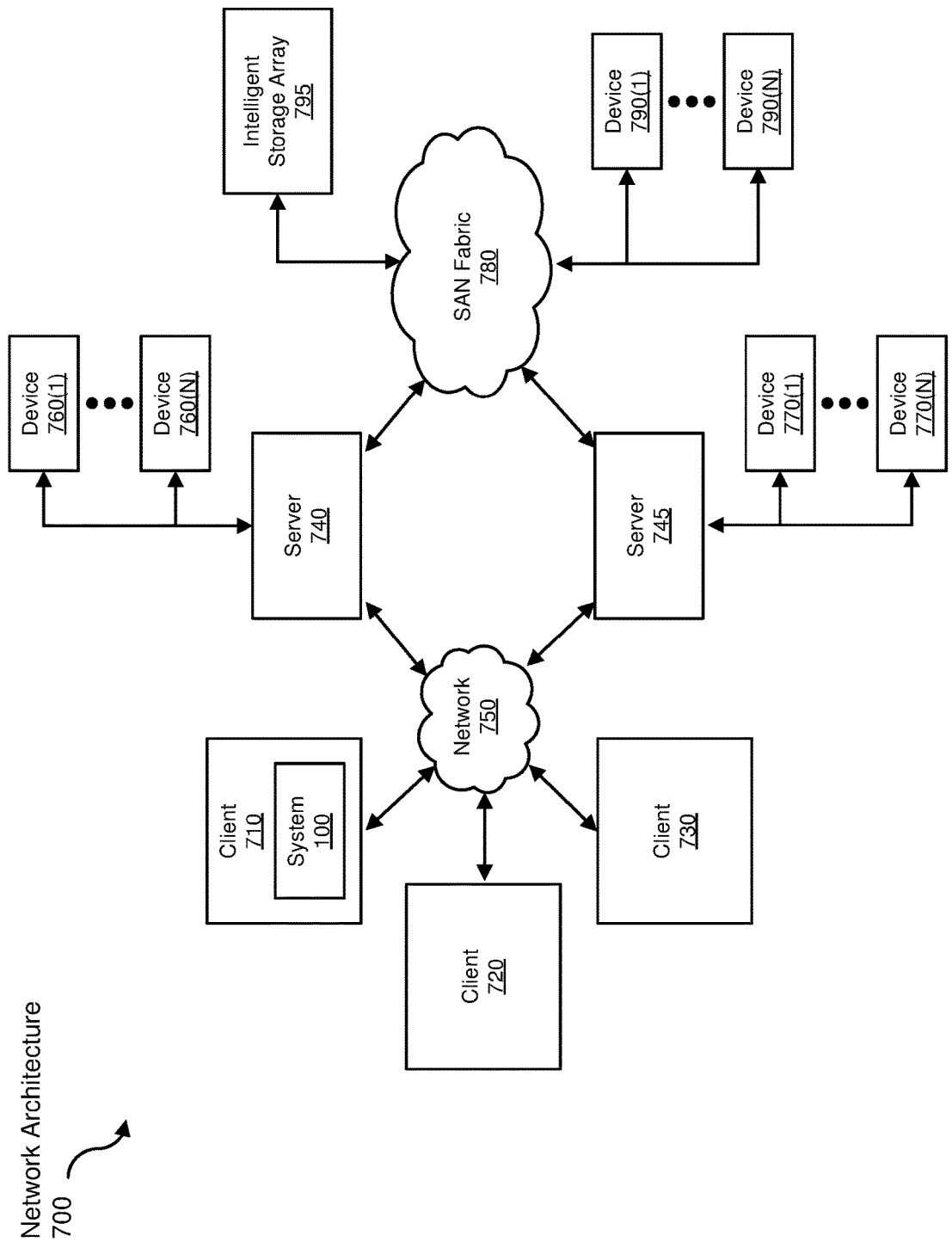
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for detecting covert channels structured in Internet Protocol (IP) transactions.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multitenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:
1. A computer-implemented method for detecting covert channels structured in Internet Protocol (IP) transactions, at least a portion of the method being performed by a computing device comprising at least one processor, the method comprising:
- intercepting an IP transaction comprising textual data and a corresponding address on the computing device;
- evaluating, by the computing device, the textual data against a model of known names to determine a difference score;
- determining, by the computing device, that the textual data is suspicious when the difference score exceeds a threshold value associated with the model;
- examining, by the computing device, upon determining that the textual data is suspicious, the address in the IP transaction to determine whether the address is invalid, wherein examining the address in the IP transaction comprises:
  - determining whether a syntax of the address corresponds to a valid IPv6 address syntax, wherein the valid IPv6 address syntax comprises a validly formatted IPv6 address comprising a predetermined number of separated hexadecimal digit groups;
  - determining whether a prefix associated with the address matches a registered domain name in a registration database, wherein the prefix comprises a /64 IPv6 prefix associated with a valid IPv6 address; and
  - determining that the address is invalid when the syntax fails to correspond to the valid IPv6 address syntax or when the prefix fails to match the registered domain name in the registration database;
- analyzing, by the computing device, the IP transaction to determine a frequency of address requests that have been initiated from a source IP address over a predetermined period; and
- identifying, by the computing device, the IP transaction as a covert data channel for initiating a malware attack when the address is determined to be invalid and the frequency of the address requests that have been initiated exceeds a frequency threshold value.

2. The computer-implemented method of claim 1, further comprising initiating a security action to protect the computing device against the malware attack.

3. The computer-implemented method of claim 1, wherein intercepting an IP transaction comprises utilizing a proxy for intercepting a domain name system (DNS) transaction including a DNS query for the address and a reply to the DNS query.

4. The computer-implemented method of claim 1, wherein intercepting an IP transaction comprises utilizing a proxy for intercepting a hypertext transfer protocol request including a uniform resource locator associated with the address.

5. The computer-implemented method of claim 1, wherein evaluating the textual data against a model of known names to determine a difference score comprises:
- comparing the textual data to a plurality of N-grams of various sizes associated with known domain names;
- determining a degree of variance between the textual data and the N-grams based on the comparison; and
- assigning the difference score to the textual data based on the degree of variance.

6. The computer-implemented method of claim 1, wherein determining that the address is invalid when the syntax fails to correspond to the valid IPv6 address syntax comprises determining that a syntax for a resolver IPv6 address at the end of a referral chain fails to correspond to the valid IPv6 address syntax.

7. The computer-implemented method of claim 1, wherein analyzing the IP transaction to determine that a frequency of address requests that have been initiated from a source IP address over a predetermined period comprises checking DNS query statistics for a frequency of requests made for the address in the IP transaction against the source IP address.

8. The computer-implemented method of claim 1, wherein identifying the IP transaction as a covert data channel for initiating a malware attack comprises identifying the address as an invalid IP address comprising one or more portions of a malware data payload.

9. The computer-implemented method of claim 1, wherein the textual data corresponds to a format associated with a valid DNS domain name.

10. The computer-implemented method of claim 1, wherein the IP transaction comprises an IPv6 transaction.

11. The computer-implemented method of claim 1, wherein the textual data comprises a domain name hierarchy comprising a main domain and at least one subdomain.

12. The computer-implemented method of claim 1, wherein determining that the address is invalid when the prefix fails to match the registered domain name in the registration database comprises determining that a resolver address prefix associated with the address fails to match the registered domain name in the registration database.

13. A system for detecting covert channels structured in Internet Protocol (IP) transactions, the system comprising:
- an intercepting module, stored in physical memory, that intercepts an IP transaction comprising textual data and a corresponding address on a computing device;
- an evaluation module, stored in the memory, that evaluates the textual data against a model of known names to determine a difference score;
- a determining module, stored in the memory, that determines that the textual data is suspicious when the difference score exceeds a threshold value associated with the model;
- an examination module, stored in the memory, that examines, upon determining that the textual data is suspicious, the address in the IP transaction to determine whether the address is invalid, wherein the address in the IP transaction is examined by:
  - determining whether a syntax of the address corresponds to a valid IPv6 address syntax, wherein the valid IPv6 address syntax comprises a validly formatted IPv6 address comprising a predetermined number of separated hexadecimal digit groups;
  - determining whether a prefix associated with the address matches a registered domain name in a registration database, wherein the prefix comprises a /64 IPv6 prefix associated with a valid IPv6 address; and
  - determining that the address is invalid when the syntax fails to correspond to the valid IPv6 address syntax or when the prefix fails to match the registered domain name in the registration database;
- an analysis module, stored in the memory, that analyzes the IP transaction to determine a frequency of address requests that have been initiated from a source IP address over a predetermined period;
- an identification module, stored in the memory, that identifies the IP transaction as a covert data channel for initiating a malware attack when the address is determined to be invalid and the frequency of the address requests that have been initiated exceeds a frequency threshold value; and at least one physical processor configured to execute the intercepting module, the evaluation module, the determining module, the examination module, the analysis module, and the identification module.

14. The system of claim 13, wherein the identification module further initiates a security action to protect the computing device against the malware attack.

15. The system of claim 13, wherein the intercepting module intercepts the IP transaction by utilizing a proxy for intercepting a domain name system (DNS) transaction including a DNS query for the address and a reply to the DNS query.

16. The system of claim 13, wherein the intercepting module intercepts the IP transaction by utilizing a proxy for intercepting a hypertext transfer protocol request including a uniform resource locator associated with the address.

17. The system of claim 13, wherein the evaluation module evaluates the textual data against a model of known names to determine a difference score by:
- comparing the textual data to a plurality of N-grams of various sizes associated with known domain names;
- determining a degree of variance between the textual data and the N-grams based on the comparison; and
- assigning the difference score to the textual data based on the degree of variance.

18. A non-transitory computer-readable medium comprising one or more computer-executable instructions that, when executed by at least one processor of a computing device, cause the computing device to:
- intercept an Internet Protocol (IP) transaction comprising textual data and a corresponding address on the computing device;
- evaluate the textual data against a model of known names to determine a difference score;
- determine that the textual data is suspicious when the difference score exceeds a threshold value associated with the model;
- examine, upon determining that the textual data is suspicious, the address in the IP transaction to determine whether the address is invalid, wherein the address in the IP transaction is examined by:
  - determining whether a syntax of the address corresponds to a valid IPv6 address syntax, wherein the valid IPv6 address syntax comprises a validly formatted IPv6 address comprising a predetermined number of separated hexadecimal digit groups;
  - determining whether a prefix associated with the address matches a registered domain name in a registration database, wherein the prefix comprises a /64 IPv6 prefix associated with a valid IPv6 address; and
  - determining that the address is invalid when the syntax fails to correspond to the valid IPv6 address syntax or when the prefix fails to match the registered domain name in the registration database;
- analyze the IP transaction to determine a frequency of address requests that have been initiated from a source IP address over a predetermined period; and
- identify the IP transaction as a covert data channel for initiating a malware attack when the address is determined to be invalid and the frequency of the address requests that have been initiated exceeds a frequency threshold value.

19. The system of claim 13, wherein determining that the address is invalid when the syntax fails to correspond to the valid IPv6 address syntax comprises determining that a syntax for a resolver IPv6 address at the end of a referral chain fails to correspond to the valid IP address syntax.

20. The system of claim 13, wherein determining that the address is invalid when the prefix fails to match the registered domain name in the registration database comprises determining that a resolver address prefix associated with the address fails to match the registered domain name in the registration database.

* * * * *